A. Tippett,
Wood Chisel.
Nº 16,041.  Patented Nov. 4, 1856.
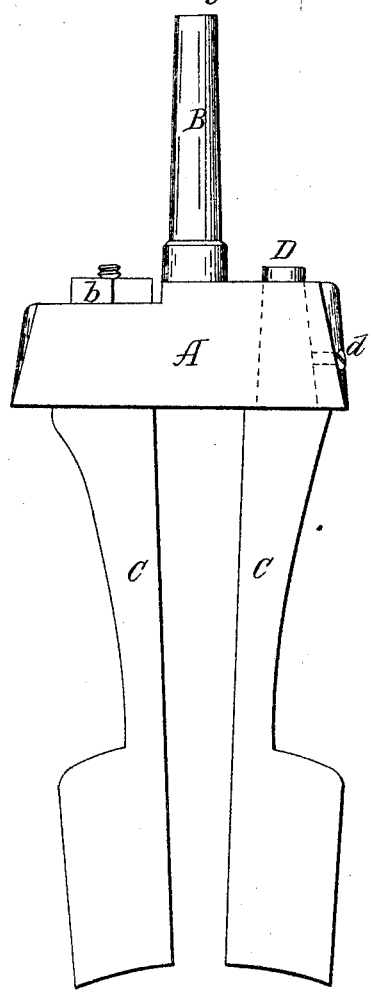
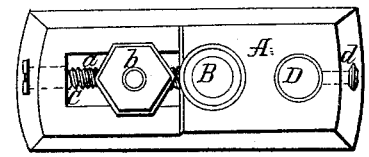
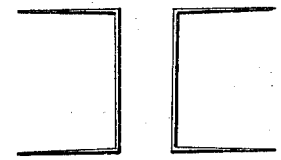
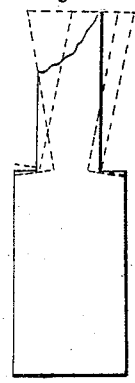
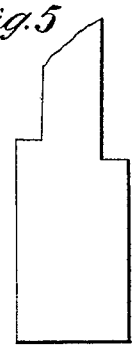

UNITED STATES PATENT OFFICE.

ALFRED TIPPETT, OF WASHINGTON, DISTRICT OF COLUMBIA.

TOOL FOR TENONING, &c.

Specification of Letters Patent No. 16,041, dated November 4, 1856.

*To all whom it may concern:*

Be it known that I, ALFRED TIPPETT, of Washington city, District of Columbia, have invented certain new and useful Improvements in Tenoning Tools or Chisels; and I do hereby declare the following to be a full, clear, and exact description of the manner of making and using the same, reference being had to the accompanying drawings, making a part thereof, in which—

Figure 1, represents a side view of the stock and cutters. Fig. 2, represents a top view of the same. Fig. 3, represents the position and shape of the cutting edges of the chisels for a straight tenon, and Figs. 4, 5 and 6, represents some of the forms of tenons which may be cut with the tool.

Similar letters in the several figures represent the same parts.

The nature of my invention consists in constructing a tenoning tool which may be used in an ordinary mortising machine, and thus save the expense of two machines—the tool being so constructed as to be adjustable, both as to the size of the tenon as well as to its shape, and is so arranged as not to require the turning of the cutters (as is common in tenoning machines) to finish a tenon, and is capable of cutting what is known in the trade as "straight," "long and short," "wedge shaped (either on one or both sides) with mitered or dove-tailed shoulders," and "half lap tenons."

To enable others skilled in the art to make and use my invention, I will proceed to describe the same with reference to the drawings.

The stock A, may be made of any suitable metal, having a spindle or shank B, thereon, which may be made to fit the socket of any ordinary mortising machine. Through said stock A, on each side of the shank B, are cut the holes for the shanks of the chisels C, and which said holes may be oblong as at *a*, so as to allow the chisel to be moved out or in for a wide or narrow tenon, and may be secured by the nut *b*, run onto a screw cut on top of the shank, and which rests against a shoulder cut in the top of the stock.

For the purpose of setting the chisel with more accuracy, a screw *c*, Fig. 2, may be used, and which may pass through the shank of the cutter for the purpose of moving it back and forth through the slot.

One of the holes in the stock may be round or conical so as to receive a round or conical shaped shank D, which may be held by a set screw *d*, and which admits of turning the chisel in the stock, so as to cut a wedge-shaped tenon as seen in Fig. 6, and which may have, as seen by the red and black lines either one or both of its sides wedge shaped, and when thus cut to the shoulder of the tenon presents a miter or dovetail to the mortise, which is a very desirable way of putting together certain work as for instance the spokes and hubs of wheels. By reversing the inclination of the cutters a dovetail may be cut also.

By arranging the cutters so as to allow one to stand in advance of the other, or by inserting a chisel with less width between the lips on one side, I can cut what is termed the "short and long tenon" (seen at Fig. 5), which is required in framing sash and doors, &c. A "half lap" may be cut by removing one of the cutters, and in all these forms of tenons the cutters do not have to be turned half around to finish them as in ordinary machines.

The chisels C, are made of steel, having two lips to each, and when in the stock are in the position shown in Fig. 3, and the cutting edges of the lips are rounded as seen in Fig. 1, so that the points of the lips shall cut in advance of the other parts, and thus preserve the wood from bruising before the cutters.

The chisels are so inclined in the stock as to clear themselves of the wood and prevent any binding or cramping thereon.

The advantages of this tool are as follows: It enables a mechanic to do both the mortising and tenoning on the same machine, thus saving the expense of one machine, it admits, by its adjustability, of cutting several varieties of tenons in common use, without change of cutters; and finishes its work without reversing or turning the cutters half around, as is common in machines for a similar purpose.

Having thus fully described my inven- tion, what I claim therein as new and desire to secure by Letters Patent is,

So making of the chisels adjustable in the stock as that they may be made to cut also a dove-tail tenon with the same tool, and without reversing the same, and so that said tool may be used in any ordinary mortising machine and thus avoid the expense of two machines; the whole being arranged specially as herein set forth, and for the purposes described.

ALFRED TIPPETT.

Witnesses:
JOHN S. HOLLINGSHEAD,
JOHN DAVIS.